(12) United States Patent
Hakamada

(10) Patent No.: US 9,409,467 B2
(45) Date of Patent: Aug. 9, 2016

(54) VEHICLE WITH TAIL GATE

(71) Applicant: HONDA MOTOR CO., LTD., Minato-Ku, Tokyo (JP)

(72) Inventor: Hitoshi Hakamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/412,330

(22) PCT Filed: May 10, 2013

(86) PCT No.: PCT/JP2013/063125
§ 371 (c)(1),
(2) Date: Dec. 31, 2014

(87) PCT Pub. No.: WO2014/006975
PCT Pub. Date: Jan. 9, 2014

(65) Prior Publication Data
US 2015/0183307 A1 Jul. 2, 2015

(30) Foreign Application Priority Data

Jul. 4, 2012 (JP) ................................. 2012-150419

(51) Int. Cl.
*B60J 5/10* (2006.01)
(52) U.S. Cl.
CPC *B60J 5/105* (2013.01); *B60J 5/101* (2013.01); *B60J 5/107* (2013.01)
(58) Field of Classification Search
CPC ............... B60J 5/10; B60J 5/101; B60J 5/105
USPC ............................. 296/146.8, 106, 50, 51, 56
See application file for complete search history.

(56) References Cited

U.S. PATENT DOCUMENTS 5,083,833 A 1/1992 Herrmeyer

FOREIGN PATENT DOCUMENTS

| CA | 2158180 A1 | 3/1997 |
|---|---|---|
| DE | 10 2007 056 853 A1 | 5/2009 |
| DE | 10 2009 030 572 A1 | 12/2010 |
| EP | 1764247 * | 9/2006 |
| EP | 2386435 * | 11/2011 |
| JP | 2514650 Y2 | 10/1996 |
| JP | 2005-053315 A | 3/2005 |
| WO | 2007090061 | 8/2007 |

OTHER PUBLICATIONS

Supplementary European Search Report dated Apr. 29, 2016 to corresponding European European Patent Application No. 13812785.7.

\* cited by examiner

*Primary Examiner* — Dennis H Pedder
(74) *Attorney, Agent, or Firm* — Carrier Blackman & Associates, P.C.; Joseph P. Carrier; Anne G. Sabourin

(57) ABSTRACT

A vehicle with a tail gate wherein the movement distance around the vehicle is reduced. In a vehicle with a tail gate, a tail gate is supported on a vehicle body such that a rear opening formed on the rear part of the vehicle body opens and closes. The tail gate has a sub opening formed on the tail gate, and a sub door for opening and closing the sub opening in the vehicle width direction. The width of the sub opening in the vehicle width direction is shorter than the width of the rear opening. One side border of the sub opening in the vehicle width direction is located in the vicinity of one edge of the tail gate in the vehicle width direction. The sub door is supported on the tail gate so as to begin to open from the side border of the opening.

5 Claims, 16 Drawing Sheets

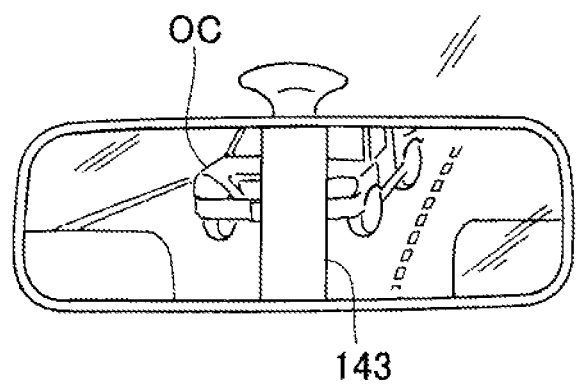
(a)
COMPARATIVE EXAMPLE
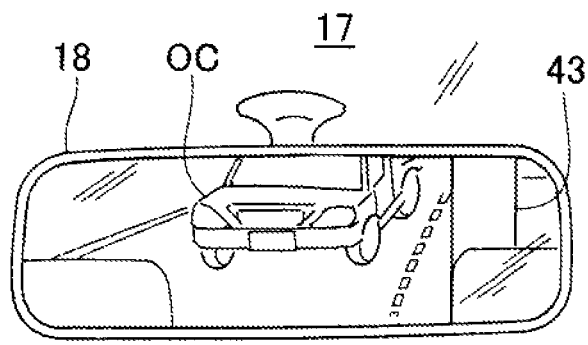
(b)
EMBODIMENT
FIG.10

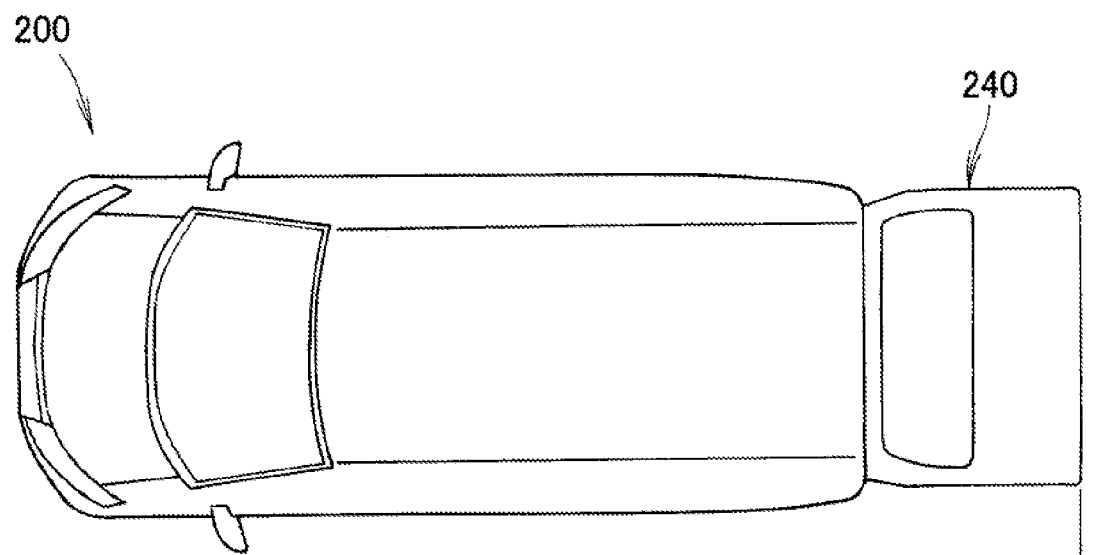
(a)
COMPARATIVE EXAMPLE
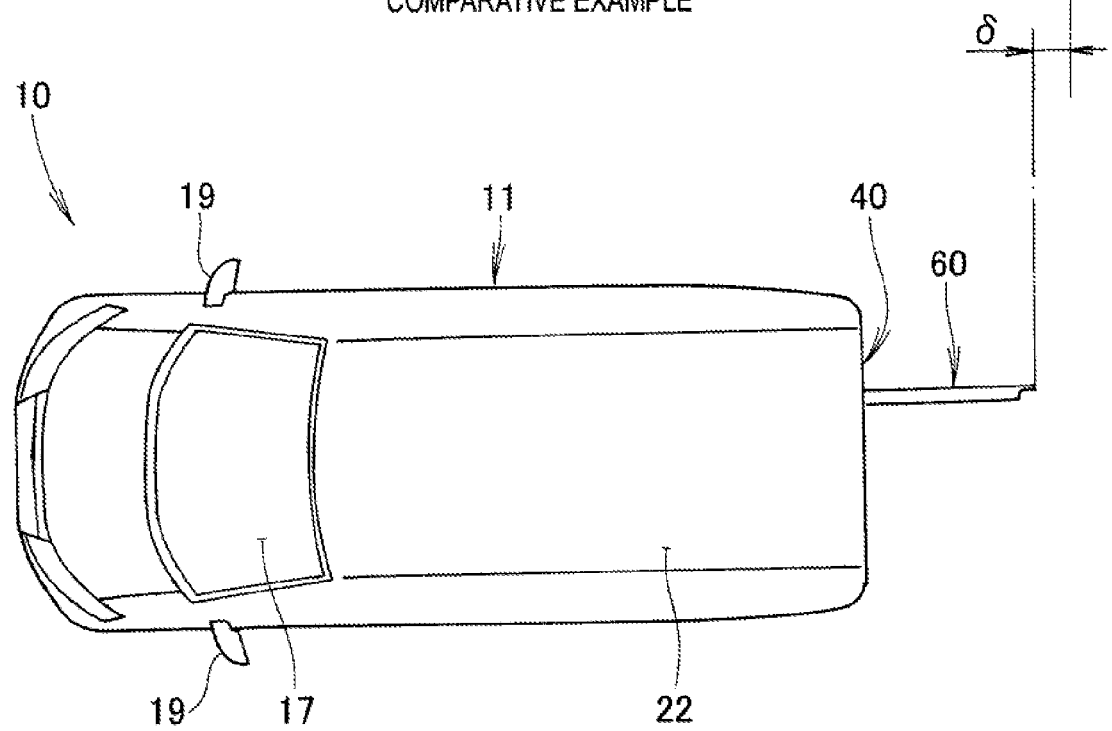
(b)
EMBODIMENT
FIG.12

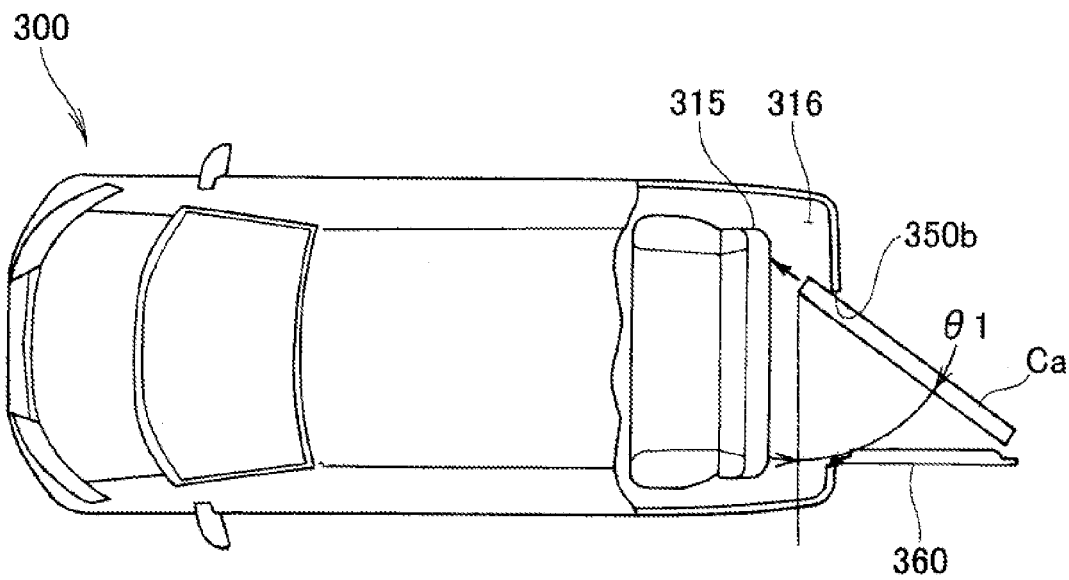
(a)
COMPARATIVE EXAMPLE
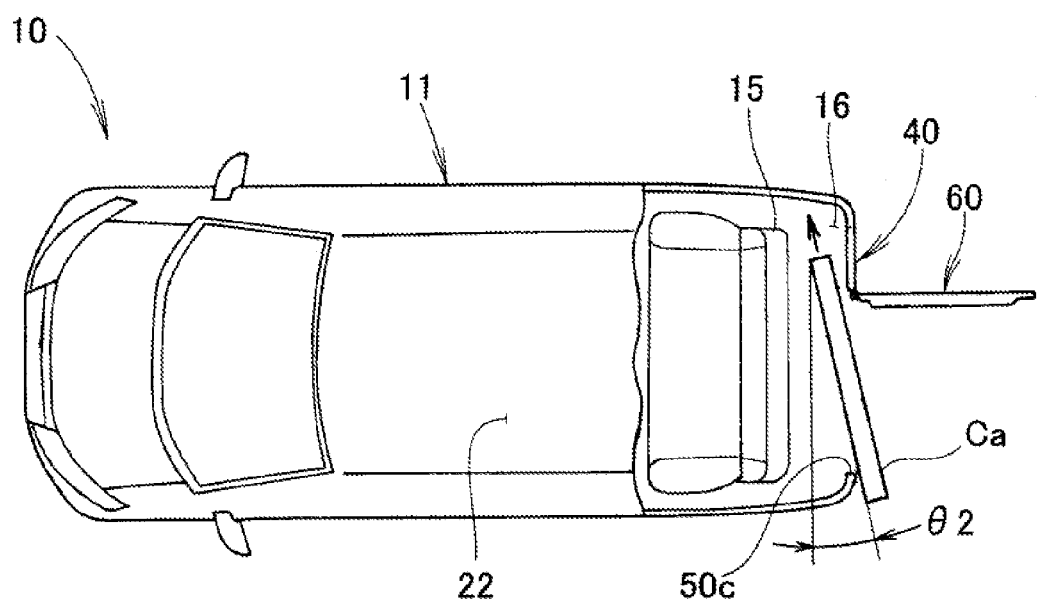
(b)
EMBODIMENT
FIG.13

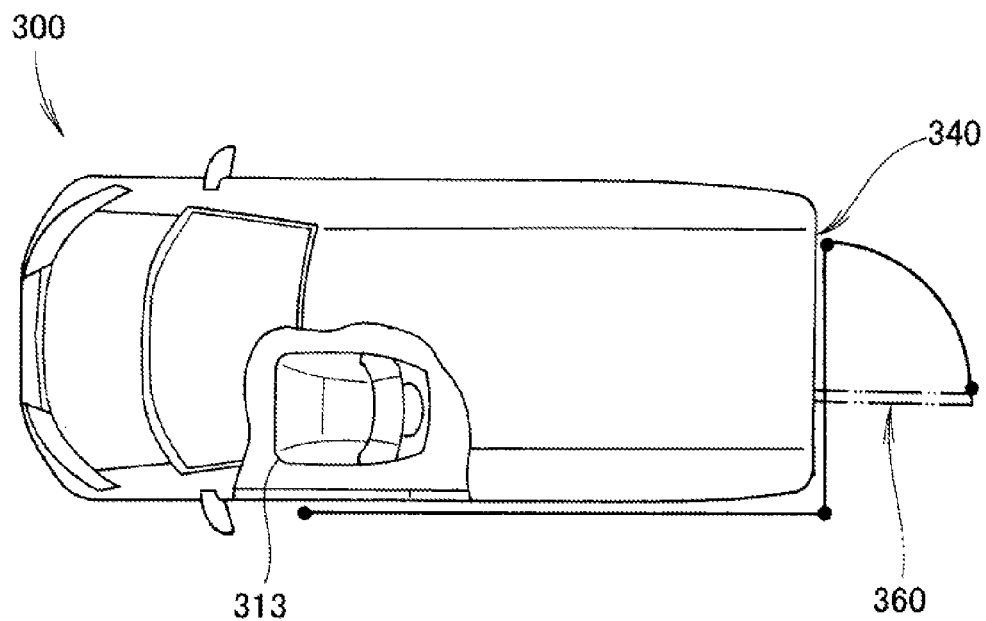
(a)
COMPARATIVE EXAMPLE
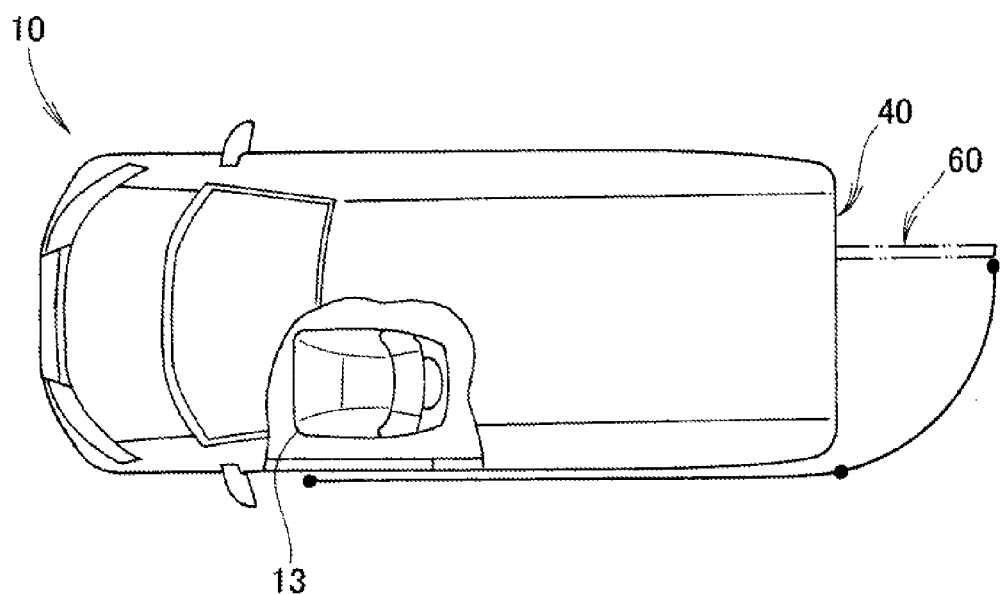
(b)
EMBODIMENT
FIG.14

VEHICLE WITH TAIL GATE

TECHNICAL FIELD

The present invention relates to a vehicle having a tail gate supported on a vehicle body for opening and closing a rear opening formed in a rear part of the vehicle body.

BACKGROUND ART

A well-known vehicle has a tail gate attached to a vehicle body for opening and closing a rear opening formed in a rear part of the vehicle body in order that luggage can be loaded into or unloaded from a luggage compartment behind a seat (e.g., see Patent Literature 1).

A vehicle as disclosed in Patent Literature 1 is comprised of a rear opening formed in a rear part of a vehicle body, a pivot axis extending in a widthwise direction of the vehicle and above the rear opening, a tail gate attached to swing on the pivot axis to open and close the rear opening, a sub opening formed in the tail gate, and a sub door for opening and closing the sub opening.

The sub door is so-called "double-leaf door". That is, the sub door has two door panels supported on the tail gate through a link mechanism in such a manner that the two panels are opened by turning away from each other in a direction from a widthwise center of the vehicle to an outside of the vehicle.

There is an occasion where luggage inside the vehicle is to be unloaded while the vehicle is stopping on the sidewalk side of a roadway. On this occasion, a vehicle passenger moves to a rear end of the vehicle and takes the necessary luggage out from the vehicle. In the case of the vehicle with a tail gate disclosed in Patent Literature 1, a vehicle passenger first moves to a rear end corner of the vehicle. Next, the passenger moves from the rear end corner to a rear end center of the vehicle and then opens the sub door for unloading the necessary luggage from the vehicle. When achieving such work, the passenger's moving distance around the vehicle should desirably be as short as possible.

PRIOR ART LITERATURE

Patent Literature

Patent Literature 1: JP-U-2514650

SUMMARY OF INVENTION

Technical Problem

It is an object of the present invention is to provide a vehicle with a tail gate, which is capable of reducing a moving distance of a vehicle passenger around the vehicle.

Solution to Problem

According to the present invention defined in claim 1, there is provided a vehicle with a tail gate, the tail gate being supported on a vehicle body for opening and closing a rear opening formed in a rear part of the vehicle body, the vehicle comprising: a sub opening formed in the tail gate; and a sub door for opening and closing the sub opening in a widthwise direction of the vehicle, wherein the sub opening has a width in the widthwise direction of the vehicle set to be smaller than a width of the rear opening; wherein the sub opening has one lateral edge in the widthwise direction of the vehicle located in the vicinity of one end of the tail gate in the widthwise direction of the vehicle; and wherein the sub door is supported on the tail gate so as to begin to open the sub opening at the one lateral edge thereof.

In the invention defined in claim 2, preferably, the sub opening is formed to open only a generally left half or a right half of the tail gate.

In the invention defined in claim 3, preferably, the vehicle body has a driver's seat disposed therein, the driver's seat being offset toward one lateral side of the vehicle relative to a widthwise center of the vehicle body. The one lateral edge of the sub opening is located oppositely from the driver's seat relative to the widthwise center of the vehicle body.

In the invention defined in claim 4, preferably, the rear opening is formed to open over the generally entire region of the rear part of the vehicle body in a height direction of the rear part of the vehicle body, and the sub opening is formed to open over the generally entire range of the rear opening in a height direction of the tail gate.

In the invention defined in claim 5, preferably, the rear opening is formed to open over the generally entire range of the rear part of the vehicle body in the widthwise direction of the vehicle.

In the invention defined in claim 6, preferably, the sub door is attached to the tail gate by hinges to allow the sub door to swing in the widthwise direction of the vehicle.

In the invention defined in claim 7, preferably, the sub door has a sub door window extending between opposite lateral ends of the sub door in the widthwise direction of the vehicle, and the tail gate has a tail gate window extending between opposite lateral ends of a portion of the tail gate in the widthwise direction of the vehicle, the tail gate portion being devoid of the sub opening. The tail gate window has the same vertical length as that of the sub door window and is located at the same level as the sub door window such that the tail gate window and the sub door window are continuous with each other in the widthwise direction of the vehicle.

In the invention defined in claim 8, preferably, the tail gate window is provided with a tail gate window glass, and the sub door window is provided with a sub door window glass. The tail gate window glass has an edge and the tail gate window glass has an edge, the edge of the tail gate window glass and the edge of the sub door window glass being opposed directly to each other.

In the invention defined in claim 9, preferably, the vehicle body has a driver's seat disposed therein, the driver's seat being offset toward one lateral side of the vehicle relative to a widthwise center of the vehicle body. A lateral edge of the sub opening located closer to a widthwise center of the vehicle body than to the one end of the tail gate is located on a side of the driver's seat relative to the widthwise center of the vehicle body.

Advantageous Effects of Invention

In the invention defined in claim 1, the sub door begins to open at the one lateral edge of the sub opening located in the vicinity of the one end of the tail gate in the widthwise direction of the vehicle body. That is, the sub door begins to open at a vicinity of a lateral end portion of the tail gate in the widthwise direction of the vehicle body. A knob for opening the sub door is normally attached to a vicinity of a region at which the sub door begins to be opened. In opening the sub door, a vehicle passenger first moves to a rear corner portion of the vehicle. Since the rear corner portion of the vehicle and the lateral end portion of the tail gate are close to each other, the knob for opening the sub door is attached to the vicinity of these portions. Thus, the passenger can open the sub door without moving to the widthwise center of the vehicle behind the vehicle. Since the passenger does not move to the widthwise center of the vehicle behind the vehicle, he or she can move the shorter distance around the vehicle.

Furthermore, the sub door begins to open at one lateral end of the tail gate and swings toward the widthwise center of the vehicle body. When an elongated article is to be loaded in the vehicle while the sub door is open, the elongated article will be put in the vehicle from a lateral outer side of the vehicle toward the back of the rear seat. For a sub door configured to start opening in a direction from the widthwise center of the vehicle toward a lateral end of the vehicle, the elongated article needs to be sufficiently inclined relative to a width of the vehicle so as not contact the sub door. However, when the inclined elongated article is put into the vehicle, it will interfere with the rear seat. According to the invention, because the sub door is configured to open toward the widthwise center of the vehicle, in putting an elongated article in the vehicle, the elongated article needs not to be inclined so as to avoid interference with the rear seat. Since the elongated article is not inclined, the elongated article does not interfere with the rear seat, and hence can be easily be put into the vehicle.

In the invention defined in claim 2, the sub opening is formed to open only the generally left half or the generally right half of the tail gate. Luggage can be loaded into or unloaded from the vehicle through the sub opening when the sub door is opened. The tail gate has a portion where the sub opening is not formed, and parts or components are attached to this portion for supporting the sub door. The sub opening occupies the generally left half or the generally right half of the tail gate to thereby ensure an opening area necessary to load or unload the luggage as well as to ensure a space sufficient to attach the parts for supporting the sub door.

In the invention defined in claim 3, the driver's seat is offset toward one lateral side relative to the widthwise center of the vehicle, and the one lateral edge of the sub opening is located oppositely from a side of the driver's seat. That is, the sub door begins to be opened at the lateral edge of the sub opening located on the side of a front passenger seat. In loading or unloading luggage in a vicinity of a street, it is preferable to do the work off the street. According to the invention, the sub door is configured to begin to be opened at the end portion on the side of the front passenger seat, thereby facilitating the loading or unloading of luggage off the street.

In the invention defined in claim 4, the rear opening is formed to open over the entire range of the rear part of the vehicle body in a height direction of the rear part of the vehicle body, and the sub opening is formed to open over the entire range of the tail gate in the height direction of the tail gate. That is, the sub opening is formed over the generally entire range of the rear opening in a height direction of the rear opening. The sub opening having a large height allows a person to get in and out of the vehicle from the rear part of the vehicle.

In the invention defined in claim 5, the rear opening is formed to open over the generally entire range of the rear part of the vehicle body in the widthwise direction of the vehicle. This arrangement ensures that a maximum opening width of the rear opening in the widthwise direction of the vehicle can be maintained and large luggage can be easily loaded in or unloaded from the vehicle while the tail gate is opened.

In the invention defined in claim 6, the sub door is attached to the tail gate by the hinges to allow the sub door to swing in the widthwise direction of the vehicle. Since the sub door is swingably supported by the hinges, the simple structure supporting the sub door can be achieved.

In the invention defined in claim 7, the sub door has a sub door window extending between opposite lateral ends of the sub door in the widthwise direction of the vehicle, and the tail gate has a tail gate door extending between opposite lateral end of a portion of the tail gate in the widthwise direction of the vehicle, the tail gate portion being devoid of the sub opening. That is, a window is formed over the generally entire region of the tail gate in the widthwise direction of the vehicle, thereby securing a wide field of view.

In the invention defined in claim 8, the tail gate window is provided with the tail gate window glass, and the sub door window is provided with the sub door window glass. The tail gate window glass has an edge, and the sub door window glass has an edge, the edge of the tail gate window glass and the edge of the sub door window glass being opposed directly to each other. Since the edges of the window glasses are opposed directly to each other, the window glasses appear to be integral with each other when the vehicle is viewed from behind, such that the vehicle has its improved design.

In the invention defined in claim 9, the lateral edge of the sub opening located closer to the widthwise center of the vehicle than to the one end of the tail gate is located on the side of the driver's seat, such that a boundary between the sub door window and the tail gate window is located on the side of the driver's seat. Since the boundary between the sub door window and the tail gate window is located in the difficult-to-view region behind the driver's seat, the driver's field of vision can be ensured.

BRIEF DESCRIPTION OF DRAWINGS

FIG. 10 is a view showing a function of a rearview mirror of the vehicle with the tail gate when the vehicle runs;

FIG. 12 is a view showing details of the sub door shown in FIG. 1;

FIG. 13 is a view showing a function of the vehicle when an elongated article is loaded into the vehicle;

FIG. 14 is a view showing a function of the vehicle when the sub door shown in FIG. 1 is opened;

DESCRIPTION OF EMBODIMENTS

Certain preferred embodiments of the present invention will be described in greater detail below with reference to the accompanying drawings.

First Embodiment

Figure 1:
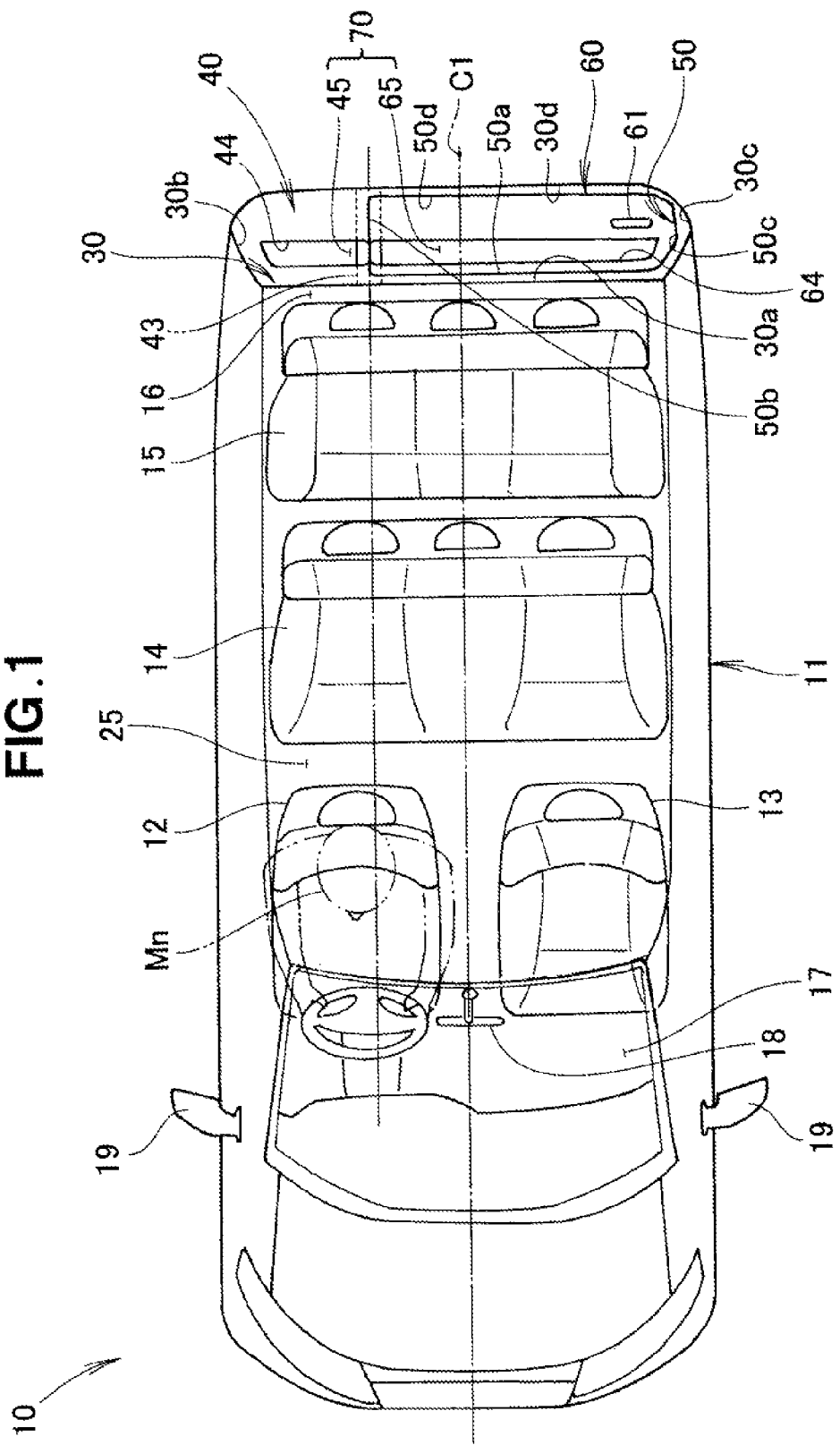
FIG. 1 is a transparent view of a vehicle with a tail gate according to a first embodiment of the present invention.

A vehicle 10 with a tail gate (hereinafter referred to as "vehicle 10") according to a first embodiment shown in FIG. 1 is a van with a steering wheel on a right side of the van. In a passenger compartment 25 of the vehicle 10, three rows of seats are arranged in a direction from a front side of a vehicle body 11 to a rear side of the vehicle body 11.

In a first or front row, a driver's seat 12 and a front passenger seat 13 are provided. A longitudinal centerline C1 extending in a front-rear direction of the vehicle through a widthwise center of the vehicle is disposed between the driver's seat 12 and the front passenger seat 13. That is, the driver's seat 12 and the front passenger seat 13 are offset relative to the longitudinal centerline C1 passing through the vehicle width center. In the vehicle with the steering wheel on the right side, the driver's seat 12 is provided on a right side of the longitudinal centerline C1 and the front passenger seat 13 is provided on a left side of the longitudinal centerline C1. In the second and third row, there are provided second and third row seats 14, 15 each of which is capable of seating three people and extends in a widthwise direction of the vehicle. The rearmost or third row seat 15 is hereinafter referred as "rear seat 15". A luggage compartment 16 for loading luggage is formed rearwardly of the rear seat 15. A swingable tail gate 40 is attached to allow for loading luggage into the luggage compartment 16 or unloading luggage from the luggage compartment 16. The luggage compartment 16 is part of the passenger compartment 25.

A rearview mirror 18 for a driver Mn to view rearwardly is mounted on a laterally central position of a windshield 17 in the widthwise direction of the vehicle. Side mirrors 19, 19 for the driver Mn to view laterally or rearwardly are attached to left and right end portions of a front part of the vehicle body 11.

Figure 2:
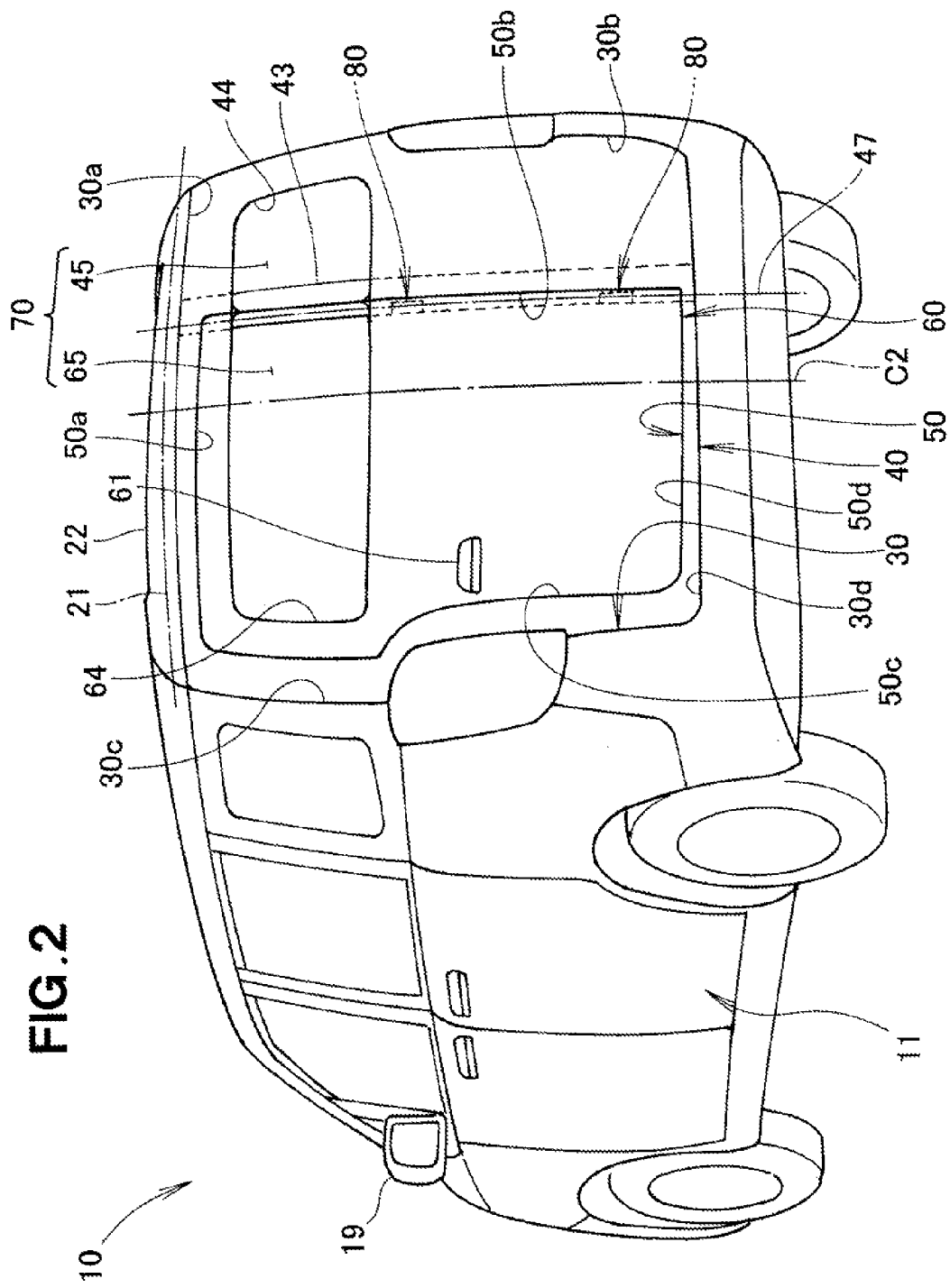
FIG. 2 is a perspective view of the vehicle with the tail gate shown in FIG. 1.
Figure 3:
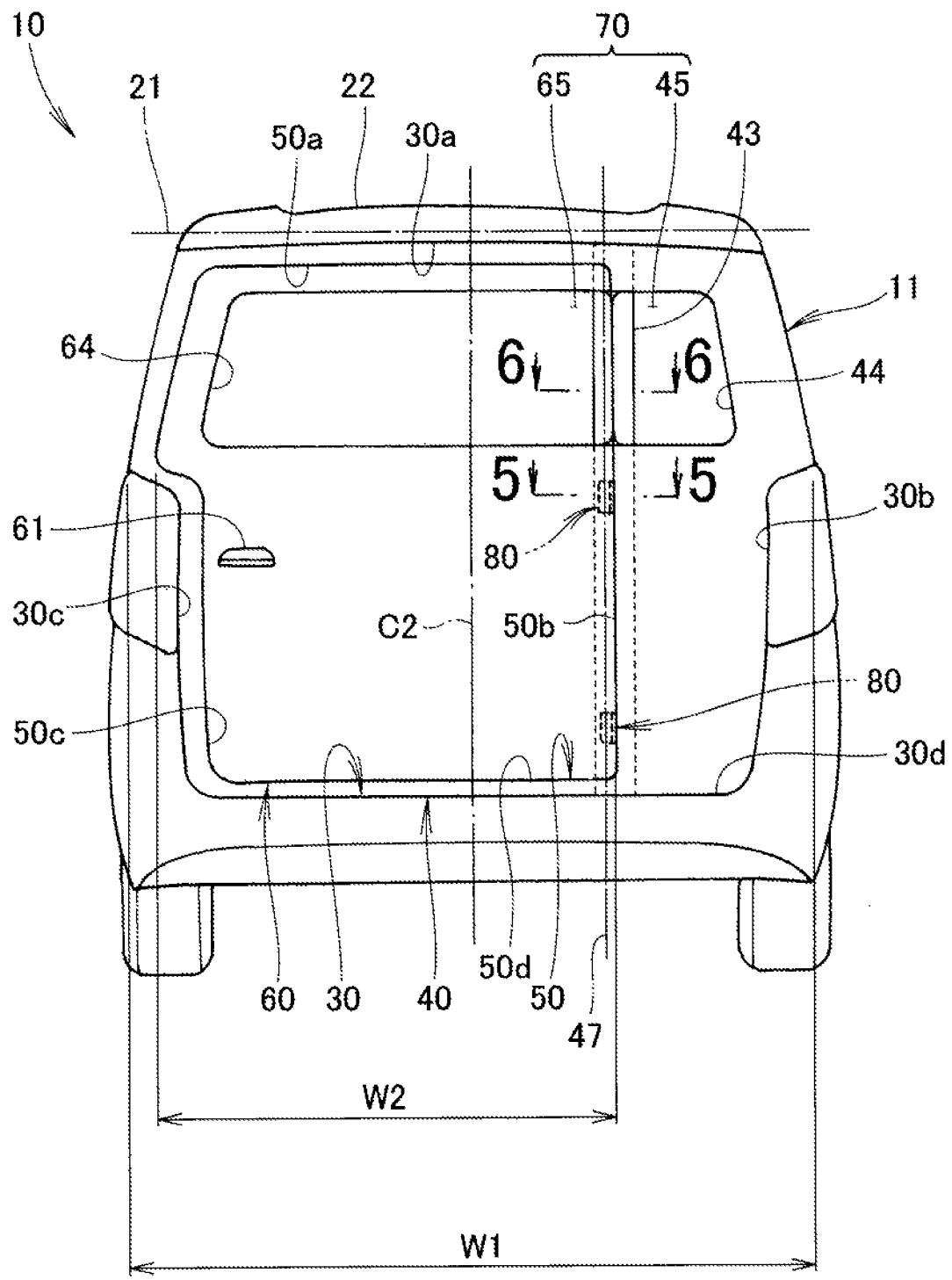
FIG. 3 is a rear elevation view of the vehicle with the tail gate shown in FIG. 1.
Figure 4:
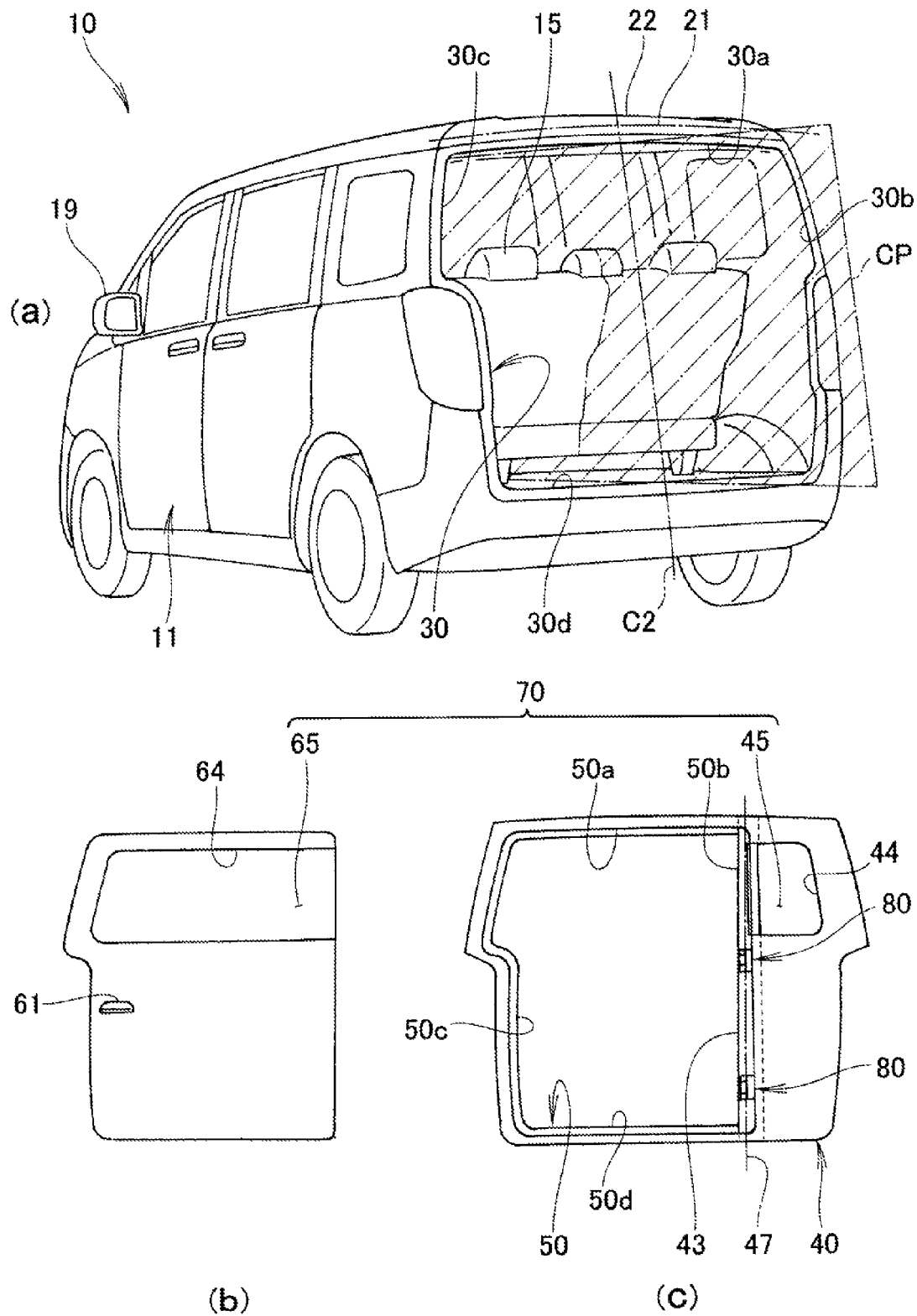
FIG. 4 is an exploded perspective view of the vehicle with the tail gate shown in FIG. 1.

As shown in FIGS. 2 to 4, the vehicle 10 has a rear opening 30 formed throughout a rear part thereof in the widthwise direction and in a vertical direction. The tail gate 40 is attached to open and close the rear opening 30. The tail gate 40 has a sub opening 50 formed therein in a height direction of the tail gate 40. A sub door 60 is attached to the sub opening 50 for opening and closing the sub opening 50.

The rear opening 30 formed in a rear part of the vehicle body 11 has a generally rectangular shape (including a generally square shape). The rear opening 30 is defined by an upper edge 30a formed in the widthwise direction in a vicinity of a roof 22 of the vehicle body 11, lateral edges 30b, 30c (reference sign "b" is a suffix representing a right side edge, and reference sign "c" is a suffix representing a left side edge) extending downwardly from opposite ends of the upper edge 30a along widthwise end portions of the vehicle body, and a lower edge 30d interconnecting lower ends of the lateral edges 30b, 30c.

The tail gate 40 is attached to an upper part of the vehicle body 11 in such a manner as to vertically swing on a first pivot axis 21 extending horizontally.

A vertically extending pillar 43 is formed in a vicinity of the sub opening 50 formed in the tail gate 40. The pillar 43 is integrally attached to the tail gate 40. Since the pillar 43 is formed in the tail gate 40, the tail gate 40 has an increased rigidity against an external force applied from a rear side of the vehicle 10.

Since the sub opening 50 is formed in the tail gate 40 in the vertical direction, the tail gate 50 has a lower strength, as compared to the case where the tail gate 50 has no sub opening 50. If the strength of the tail gate is low, the tail gate may be elastically deformed at a peripheral edge of the sub opening 50 due to vibration from a road when the vehicle is running. To address this, the pillar 43 is provided along a lateral edge of the sub opening 50. Since the pillar 43 is provided along the lateral edge of the sub opening 50 in the vertical direction, the strength of the tail gate 40 is increased to thereby reduce occurrence of the elastic deformation.

The tail gate 40 has a tail gate window 44 which is an opening formed in an upper part of the tail gate 40 to view an outside of the vehicle from the passenger compartment. The tail gate window 44 is covered by a tail gate window panel 45 made of glass. The tail gate window panel 45 covers not only the tail gate window 44 but also a pillar's outer side facing the outside of the vehicle.

It is understood that the tail gate window panel 45 can be made of any material other than glass provided that the panel is a transparent panel such as a resinous panel. The tail gate window panel 45 is hereinafter referred to as "tail gate window glass 45".

The sub opening 50 has a generally rectangular shape and is defined by an upper edge 50a formed along the upper edge 30a of the rear opening 30, a lateral edge 50b extending downwardly from one end of the upper edge 50a along the pillar 43, a lateral edge 50c extending downwardly from an opposite end of the upper edge 50a along the lateral edge 30c of the rear opening 30, and a lower edge 50d interconnecting lower ends of the lateral edges 50b, 50c.

A vertically extending centerline C2 passing through the widthwise center of the vehicle is located between the lateral edges 50b, 50c of the sub opening 50. That is, the lateral edges 50b, 50c of the sub opening 50 are located in a region avoiding the widthwise center of the vehicle. The sub opening 50 formed in the tail gate 40 has a width extending in the widthwise direction of the vehicle and the width is, off course, smaller than a width of the rear opening 30. The vertically extending centerline C2 is orthogonal to the first pivot axis 21.

The sub door 60 is supported by the pillar 43 through two hinges 80. The sub door 60 can swing on a second pivot axis 47 extending vertically through centers of the two hinges 80. The sub door 60 can horizontally swing in the front-rear direction of the vehicle.

In a vicinity of a lateral end of the sub door 60 in the widthwise direction of the vehicle, a sub door knob 61 for unlocking the sub door 60 is attached to the sub door 60. By pulling the sub door knob 61, an operator can unlock the sub door 60 to swing the sub door 60. The sub door 60 can swing from the lateral end of the sub door 60 toward the widthwise center of the vehicle.

The sub door 60 has a sub door window 64 which is an opening formed in an upper part of the sub door 60 for viewing the outside of the vehicle from the passenger compartment, and the sub door window 64 is continuous with the tail gate window 44. The sub door window 64 is covered by a sub door window panel 65 made of glass.

It is understood that the sub door window panel 65 can be made of any material other than glass provided that the panel is a transparent panel such as a resinous panel. The sub door panel 65 is hereinafter referred to as "sub door window glass 65".

The tail gate window 44 has the same height as that of the sub door window 64 (the window 44 has the same vertical length as that of the sub door window 64), and is located at the same level as the sub door window 64, such that the tail gate window 44 and the sub door window 64 are integral and continuous with each other. The tail gate window 44 and the sub door window 64 are collectively referred to as "window 70". The window 70 extends throughout the vehicle width and hence, off course, is formed at least in the widthwise center of the vehicle. The pillar 43 vertically continuously extends between the tail gate window 44 and the lateral edge 50b of the sub opening 50 located in a vicinity of the tail gate window 44.

Figure 3A:
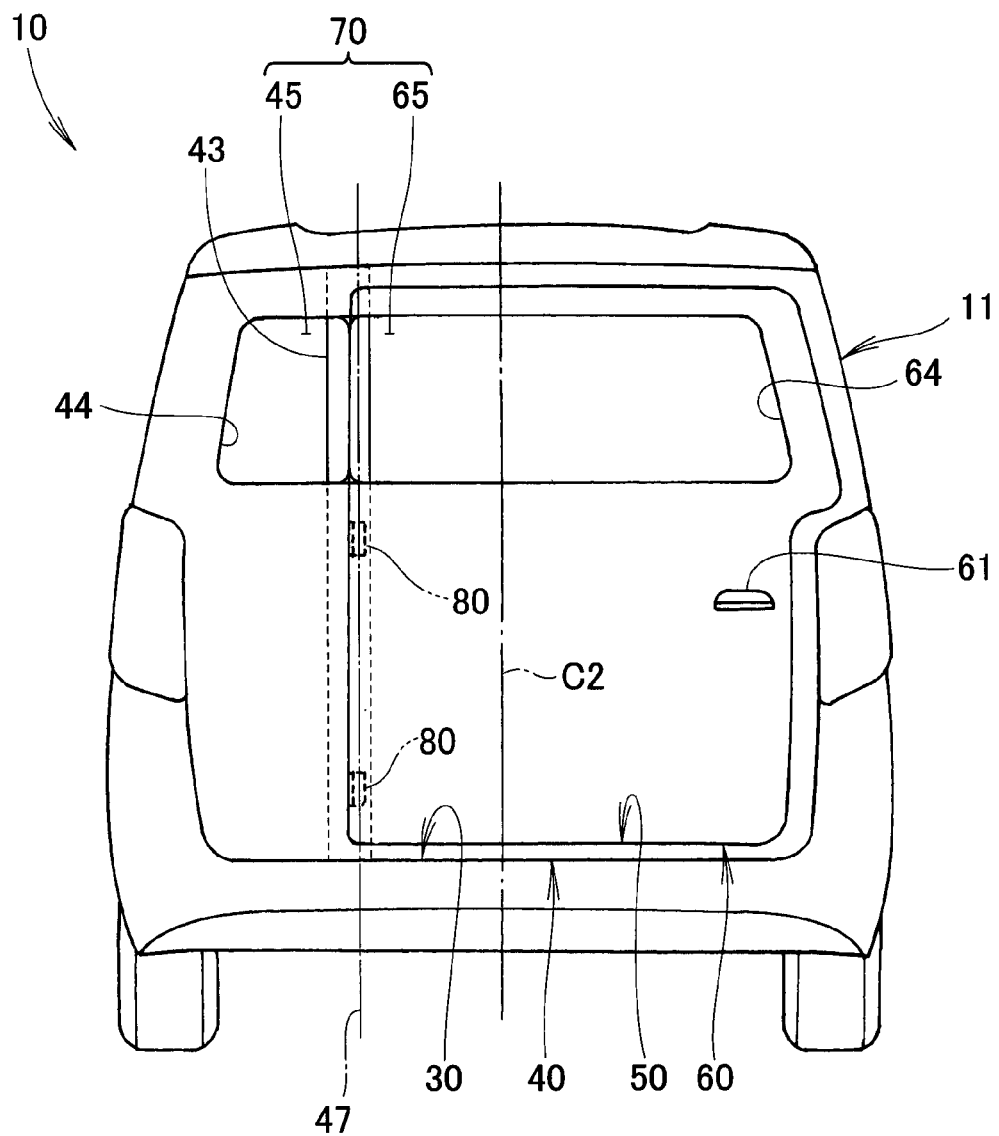
FIG. 3A is a rear elevation view of the vehicle with the tail gate shown in FIG. 1, having a sub opening in the right half.

Referring particularly to FIG. 3, the sub opening 50 is formed to open throughout the range of a generally left half of the tail gate 40. The term "generally half" used herein means that a width W2 of the sub opening 50 is 0.3 to 0.7 relative to a width W1 of the tail gate 40. That is, W2=0.3.about.0.7.times.W1. In the present invention, the value of the ratio of W2 to W1 is in the range of 0.3 to 0.7 including 0.5 which means a half value of the width of the tail gate 40. The same goes for the sub opening 50 if the sub opening 50 is formed in a right half of the tail gate 40, as shown in FIG. 3A. The width of the sub opening 50 of FIG. 3 and FIG. 3A has a value of 0.7.times.W1 relative to the width W1 of the tail gate 40. That is, in FIG. 3, W2=0.7.times.W1.

If the width W2 of the sub opening 50 is less than a value of 0.3×W1, the width of the sub opening 50 is so small that luggage cannot be loaded or unloaded or a passenger cannot get in or out of the vehicle. On the other hand, if the width W2 exceeds a value of 0.7×W1, the sub door 60 protrudes too much in the front-rear direction of the vehicle when the sub door 60 is opened.

The width W2 of the sub opening 50 is set to be a value of 0.3~0.7×W1. That is, the width of the sub opening 50 is set to be generally half of the width W1 of the tail gate to ensure a sufficient space for loading or unloading of luggage or boarding or alighting of a passenger. In addition, the sub door 60 can protrude a reduced amount when the sub door 60 is opened, thereby reducing occurrence of interference of the sub door 60 with goods or articles set around the vehicle 10.

As shown particularly in FIG. 4, a vertical plane extending in the front-rear direction of the vehicle body 11 such that the vertically extending centerline C2 passing through a lateral center of the tail gate 40 lies in this vertical plane is defined as a central vertical plane CP. The window 70 crosses the central vertical plane CP.

As shown in FIGS. 1 and 3, the lateral edge 50c of the sub opening 50 extending along a widthwise end of the vehicle is located oppositely from the driver's seat 12 relative to the longitudinal centerline C1 extending in the front-rear direction of the vehicle body through the vehicle width center and the vertically extending centerline C2 extending through the widthwise center of the tail gate. The lateral edge 50b of the sub opening 50 closer to the widthwise center of the vehicle than to the widthwise end of the vehicle is located on a side of the driver's seat 12 relative to the vehicle widthwise center C1 extending in the front-rear direction of the vehicle and the vehicle widthwise center C2 extending vertically.

The pillar 43 and the second pivot axis 47 are attached to a location overlapping the driver's seat 12 when the vehicle body 11 is viewed from behind. The second pivot axis 47 extends alongside the lateral edge 50b of the sub opening 50. The lateral edge 50b of the sub opening 50 can be interpreted as a lateral edge of the driver's seat side.

Figure 5:
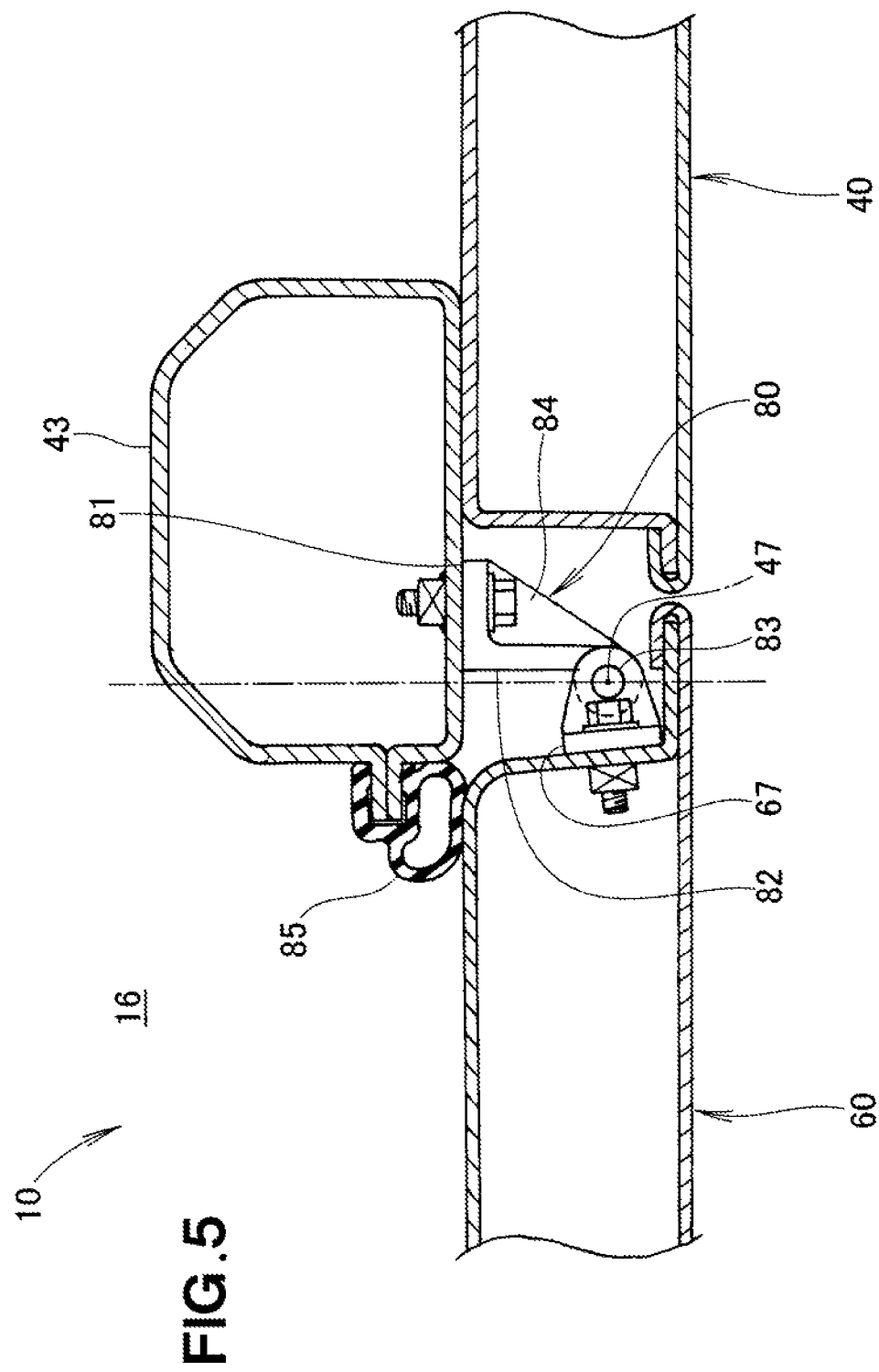
FIG. 5 is a cross-sectional view taken along line 5-5 of FIG. 3.

As shown in FIG. 5, the sub door 60 is supported by the pillar 43 of closed cross-sectional shape through the hinges 80. Attached to the pillar 43 are the hinges 80 and a seal member 85 sealing against the sub door 60 and the passenger compartment. The closed cross-sectional shape of the pillar 43 increases the rigidity of the pillar 43.

The hinge 80 is generally L-shaped and is comprised of a bottom portion 81 attached to the pillar 43, an arm portion 82 extending from the bottom portion 81 in a rearward direction of the vehicle body, a pin 83 attached to a distal end of the arm portion 82 and supporting the sub door 60 in such a manner as to allow the swing movement of the sub door 60, and a reinforcement portion 84 extending between the bottom portion 81 and the arm portion 82 and reinforcing the portions 81, 82. An attachment member 67 is fastened to the sub door 60 and the pin 83 passes through the attachment member 67.

The sub door 60 is attached to the tail gate 40 by the hinges 80 to allow the sub door 60 to swing in the front-rear direction of the vehicle body. Since the sub door 60 is swingably supported by the hinges 80, the simple structure supporting the sub door 60 can be achieved.

Since the pillar 43 of high rigidity supports the sub door 60 through the hinges 80, further, the rigidity to support the sub door 60 can be enhanced.

Figure 6:
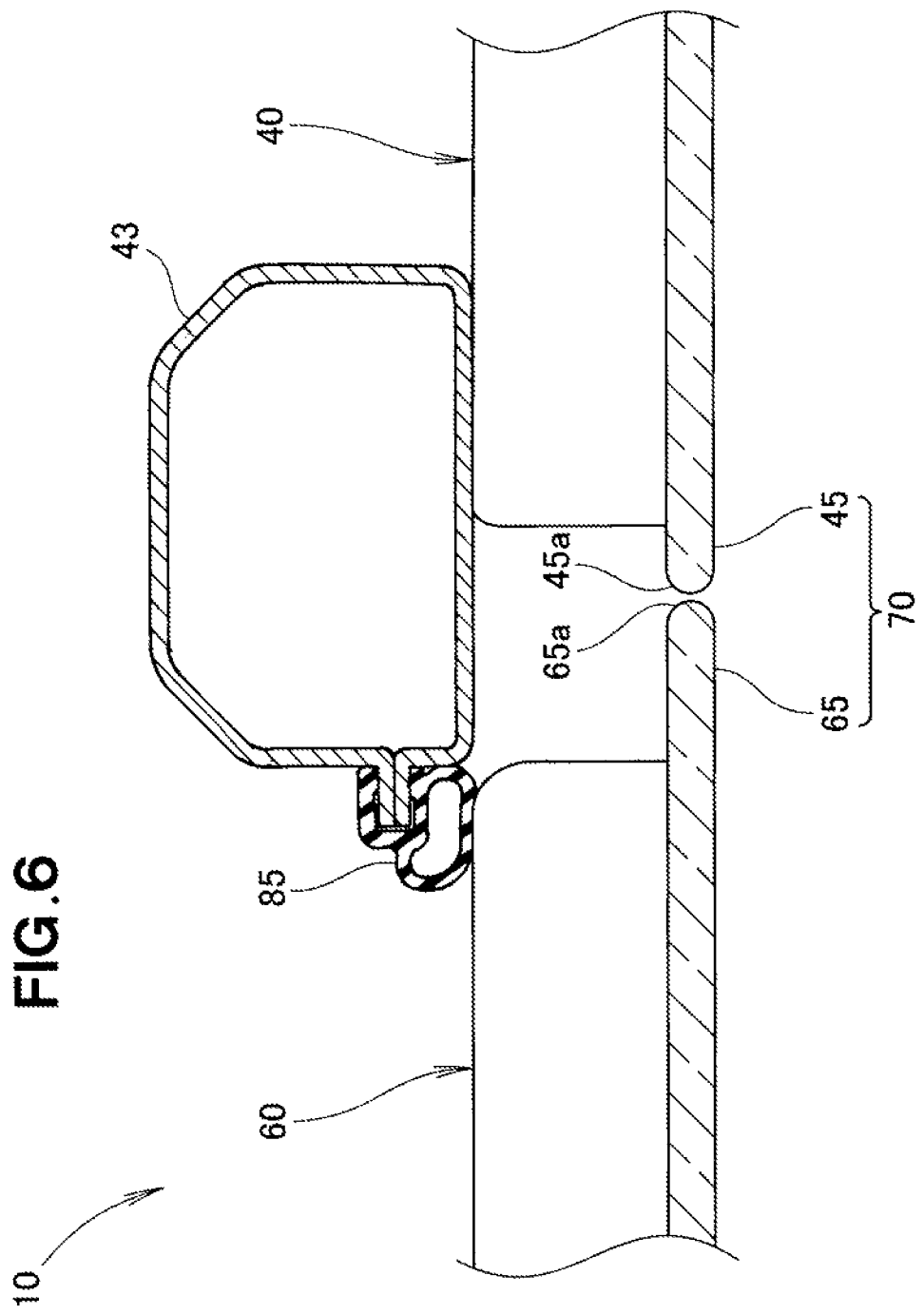
FIG. 6 is a cross-sectional view taken along line 6-6 of FIG. 3.

Next, detailed discussions of the tail gate window glass 45 and the sub door window glass 65 are made with reference to FIG. 6.

As shown in FIG. 6, respective edges 45a, 65a of the window glasses 45, 65 are opposed to each other. Since the edges 45a, 65a of the window glasses 45, 65 are opposed directly to each other, the window glasses 45, 65 appear to be integral with each other when the vehicle 10 is viewed from behind, such that the vehicle has its improved design.

In addition, the edges 45a, 65a of the respective window glasses 45, 65 are both rounded or arc-shaped in cross section. The sub door window glass 65 swings together with the sub door 60. The arc-shape of each of the edges 45a, 65a of the window glasses 45, 65 prevents interference between the edges 45a, 65a when the sub door glass 65 swings. The edges 45a, 65a may be disposed closer to each other to further improve the design so long as the interference therebetween is prevented.

Figure 7:
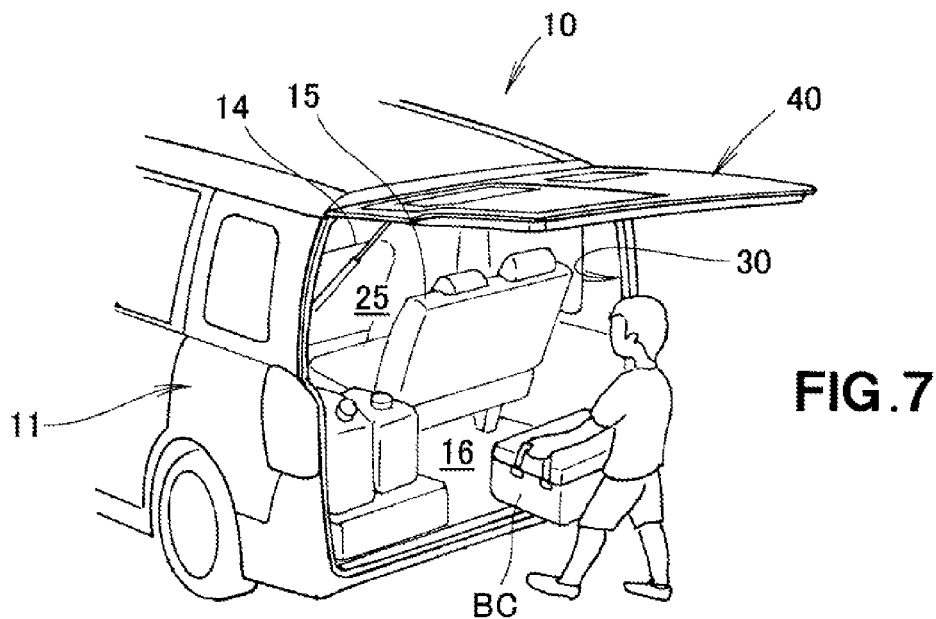
FIG. 7 is a view showing a function of the vehicle when the tail gate shown in FIG. 1 is opened.
Figure 8:
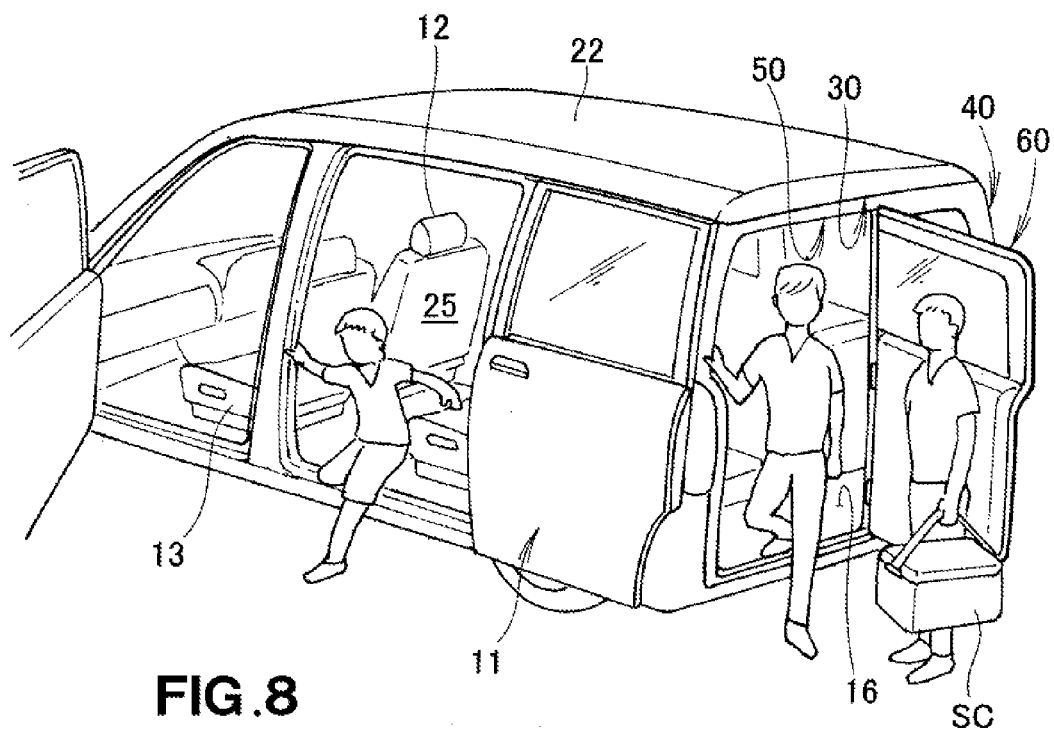
FIG. 8 is a view showing a function of the vehicle when a sub door shown in FIG. 1 is opened.

A discussion as to the vehicle 10 is made with reference to FIGS. 7 and 8.

As shown in FIG. 7, when big luggage BC is to be loaded into the vehicle 10, the tail gate 40 is swung upwardly. Since the rear opening 30 is formed to open in the entire range of the rear part of the vehicle body 11, the big luggage BC can be loaded into the vehicle 10.

As shown in FIG. 8, the rear opening 30 is formed to open over the entire range of the rear part of the vehicle body 11 in a height direction of the rear part of the vehicle body 11. The sub opening 50 is formed to open over the entire range of the tail gate 40 in the height direction of the tail gate 40. That is, the sub opening 50 is formed over the generally entire range of the rear opening 30 in a height direction of the rear opening 30. The sub opening 50 having a large height allows a person to get in and out of the vehicle 10 from the rear part of the vehicle 10.

When small luggage SC is to be loaded into the vehicle 10, the sub door 60 is horizontally swung, such that the sub door 60 begins to be opened at the lateral edge 50 which is located on a lateral end side of the sub opening 50 in the widthwise direction of the vehicle. Since the sub door 60 is part of the tail gate 40, the sub door 60 is lighter than the tail gate 40. The sub door 60 lighter than the tail gate 40 is easy to open and close and thus provides a superior operability.

Referring also to FIG. 3, the sub opening 50 is formed to open over the entire range of the generally left half of the tail gate 40. The small luggage SC can be loaded into or unloaded from the vehicle through the sub opening 50 when the sub door 60 is opened. The tail gate 40 has a portion where the sub opening 50 is not formed, and the hinges 80 are attached to this portion for supporting the sub door 60. The sub opening 50 occupies the entire range of the generally left half of the tail gate 40 to thereby ensure an opening area necessary to load or unload the small luggage SC as well as to ensure a space sufficient to attach the hinges 80 for supporting the sub door 60.

Figure 9:
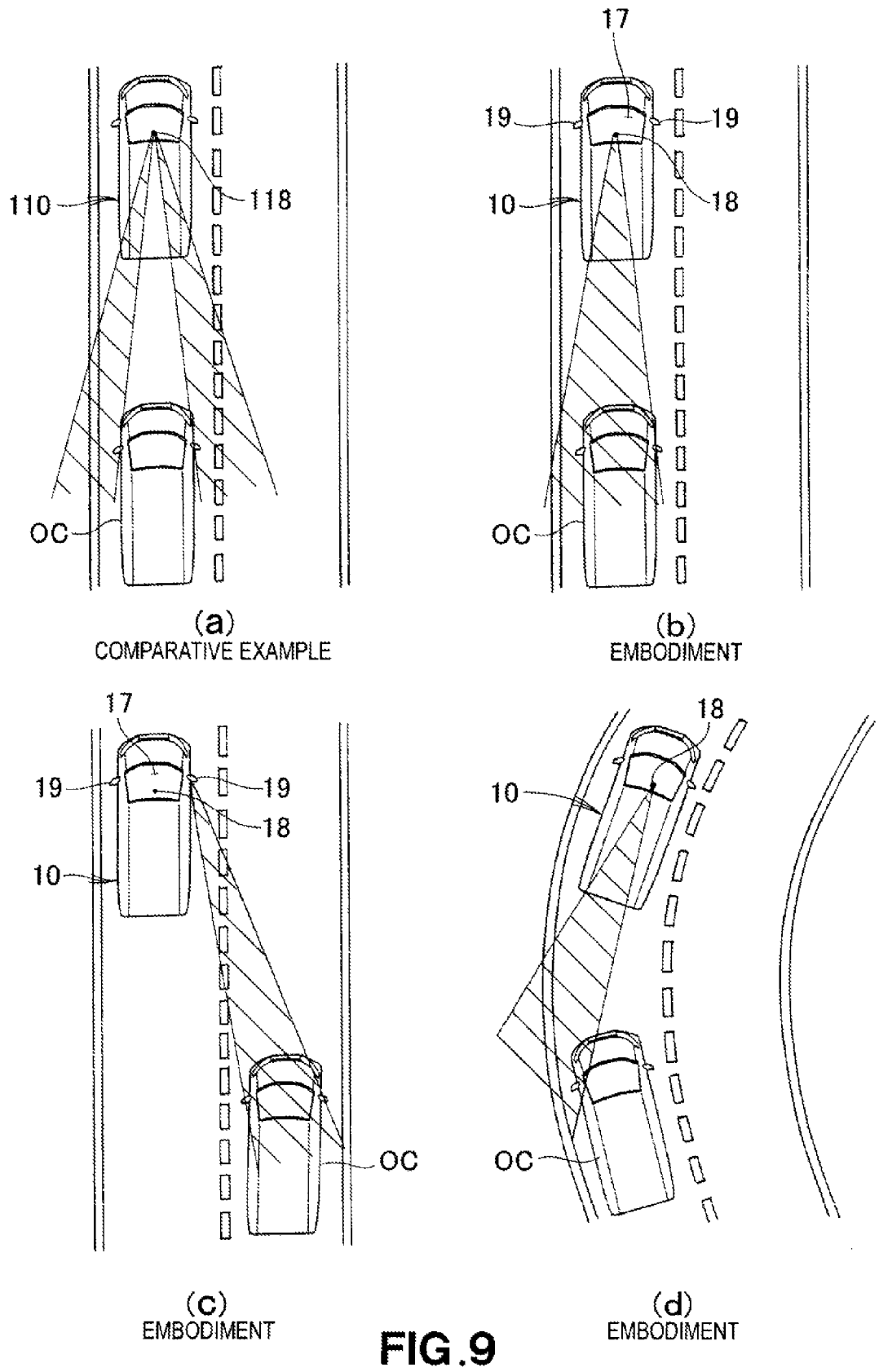
FIG. 9 is a view showing a function of the vehicle with the tail gate when the vehicle is running.

A discussion as to the traveling vehicle 10 is made with reference to FIGS. 9 and 10.

As shown in comparative examples of FIG. 9(a) and FIG. 10(a), a vehicle 110 has a pillar 143 located at the widthwise center of the vehicle. The pillar 143 overlaps a most part of another vehicle OC running behind the vehicle 110. It is thus difficult for a driver of the vehicle 110 to view the vehicle OC through a rearview mirror 118. When a distance between the vehicle 110 and the vehicle OC running behind the vehicle 110 increases, the pillar 143 is completely aligned with the vehicle OC, in which case the driver of the vehicle 110 may not view the vehicle OC.

Shaded regions each located between lines extending from the rearview mirror 118 shown in FIG. 9(a) are regions which the driver can view through the rearview mirror 118. In other words, a view of a region between the shaded regions is obstructed by the pillar 143.

As shown in the embodiment of FIG. 9(b) and FIG. 10(b), although the pillar 43 disposed on the right (driver's) side of the vehicle body 11 obstructs part of a view on the rearview mirror 18, the vehicle OC running behind the vehicle 10 can be viewed through the rearview mirror 18 because the pillar 43 is offset rightward.

Additionally, as shown in FIG. 9(c), when another vehicle OC runs on a lane outside the driver's seat of the vehicle 10, the vehicle OC running behind the vehicle 10 can be viewed through the side mirror 19. As shown in FIG. 9(d), further, even when the vehicle 10 runs on a curved lane, the vehicle OC running behind the vehicle 10 can be sufficiently viewed.

Figure 11:
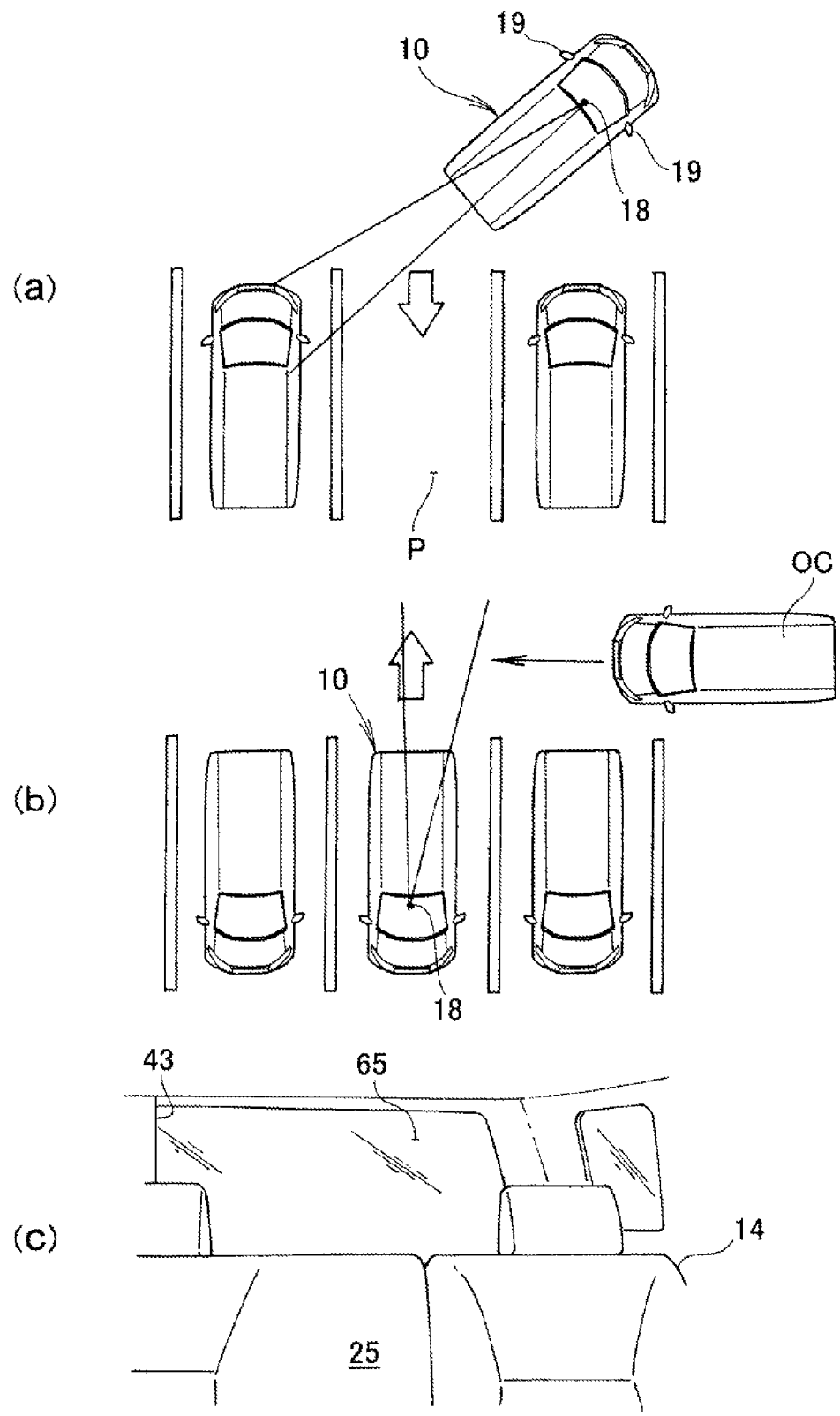
FIG. 11 is a view showing a function of the vehicle when the vehicle is parked.

A discussion as to the vehicle moving back is made with reference to FIG. 11.

The vehicle 10 may move back for parking in a parking lot P of premises, as shown in FIG. 11(a), or the vehicle 10 may move back to a location where another vehicle OC runs, such as a passageway of a service area of an express highway, as shown in FIG. 11(b).

Referring also to FIG. 11(c), when the vehicle 10 moves back, the driver can be given a wide view because the pillar 43 is disposed in a region overlapping the driver's seat.

Referring to FIG. 3 as well as to FIGS. 9 and 10, the foregoing is summarized as follows.

The lateral edges 50b, 50c of the sub opening 50 are located in the regions avoiding the widthwise center C2 of the vehicle body 11, and the window 70 is provided in the lateral center C2 of the tail gate 40. Since the window 70 is provided at least in the center C2, the minimum necessary view can be ensured. Since the lateral edges 50b, 50c of the sub opening 50 are located in regions avoiding the window 70, additionally, the lateral edges 50b, 50c do not obstruct the field of vision. That is, the vehicle 10 according to the present invention ensures high visibility in spite of having the sub door 60 mounted thereto.

The sub door window 64 extends between opposite lateral ends of the sub door 60 in the widthwise direction of the vehicle while the tail gate window 44 extends between opposite lateral ends of the tail gate 40 in the widthwise direction of the vehicle. That is, the window 70 extends in the widthwise direction of the vehicle. The window 70 formed over the wide range, and the lateral edges 50b, 50c not obstructing the field of vision can achieve high visibility.

The tail gate window 44 and the sub door window 64 are located at generally the same level relative to the tail gate 40. That is, the tail gate window 44 and the sub door window 64 are continuous with each other, such that a continuous view can be provided in a height direction.

Referring to FIGS. 1 and 2, the foregoing is summarized as follows.

In the vehicle body 11, the driver's seat 12 is disposed in an offset position relative to the longitudinal and vertical centerlines C1, C2 and the pillar 43 (the second pivot axis 47) is attached to the location overlapping the driver's seat 12 when the vehicle body 11 is viewed from behind. That is, the pillar 43 (the second pivot axis 47) is provided at the location overlapping the driver's seat 12. The location overlapping the driver's seat 12 in the front-rear direction of the vehicle 10 is difficult for the driver Mn to view. That is, the pillar 43 (the second pivot axis 47) is provided avoiding a region which the driver Mn may easily bring into his/her field of vision, thereby ensuring a better driver's field of vision.

The lateral edge 50b closer to the widthwise center of the vehicle than the lateral edge 50c is located on the side of the driver's seat 12 relative to the centerlines C1, C2, such that a boundary between the sub door window 64 and the tail gate window 44 is located on the side of the driver's seat 12. Since the boundary between the sub door window 64 and the tail gate window 44 is located in the difficult-to-view region behind the driver' seat 12, the driver's field of vision can be ensured.

A discussion as to the sub door 60 is made with reference to FIGS. 12 to 14.

As shown in a comparative example of FIG. 12(a), a vehicle 200 having a tail gate 240 without any sub door needs to be opened when luggage is to be loaded into or unloaded from the vehicle. When the tail gate 240 is opened, the tail gate 240 protrudes in the rearward direction of the vehicle by a distance equal to the height of the tail gate 240.

As shown in FIG. 12(b), on the other hand, the vehicle 10 in the embodiment has the sub door 60 attached to part of the tail gate 40. The sub door 60 has its generally half width of the width of the tail gate 40. Because of the small width of the sub door 60, an amount of protrusion of the sub door 60 in the rearward direction of the vehicle 10 is made smaller by a protrusion difference δ than an amount of protrusion of the tail gate 240 when the tail gate 240 is opened. The smaller amount of the protrusion of the sub door 60 in the rearward direction of the vehicle 10 reduces occurrence of interference of the sub door 60 with goods or articles around the vehicle 10 when the sub door 60 is opened or closed. That is, luggage can be loaded into or unloaded from the vehicle in a small space.

As shown in FIG. 13(a), a vehicle 300 in a comparative example has a sub door 360 pivotable from a widthwise center of the vehicle toward a widthwise end portion of the vehicle. That is, the sub door 360 begins to be opened at a lateral edge 350b located on a side of the widthwise center of the vehicle. In putting elongated luggage Ca such as a golf bag or a baby carriage into a luggage compartment 316 of the vehicle 300, the luggage Ca needs to be sufficiently inclined relative to a width of the vehicle so as not to contact the sub door 60. That is, an angle θ1 of the inclination of the luggage Ca is large. However, when the inclined luggage Ca is brought close to the luggage compartment 316, a tip of the luggage Ca may contact a rear seat 315, and hence the luggage Ca may not be well put into the luggage compartment 316.

As shown in FIG. 13(b), on the other hand, the sub door 60 of the vehicle 10 is opened from the widthwise end portion of the vehicle toward the widthwise center of the vehicle. Since the sub door 60 is opened toward the widthwise center of the vehicle, slight inclination of the luggage Ca relative to the widthwise direction of the vehicle suffices to put the luggage Ca into the luggage compartment. That is, an angle θ 2 of the inclination of the luggage Ca is small. Since the luggage Ca is slightly inclined, the luggage Ca does not interfere with the rear seat 15, and hence can be easily put into the luggage compartment.

As shown in FIG. 14(a), the sub door 360 of the vehicle 300 of the comparative example begins to be opened at a vicinity of a lateral center of a tail gate 340 in the widthwise direction of the vehicle. A knob for opening the sub door 360 is attached to a vicinity of a region at which the sub door 360 begins to be opened. That is, the knob is attached to the widthwise center of the vehicle. In opening the sub door 360, a passenger first moves from a front passenger seat 313 to a rear corner portion of the vehicle 300. Next, the passenger moves from the rear corner to a rear center of the vehicle 300 and then opens the sub door 360.

As shown in FIG. 14(b), on the other hand, the sub door 60 of the vehicle 10 in the embodiment begins to be opened at a vicinity of a lateral end portion of the tail gate 40 in the widthwise direction of the vehicle. The knob 61 (FIG. 3) for opening the sub door 60 is attached to a vicinity of a region at which the sub door 60 begins to be opened. In opening the sub door 60, a passenger first moves from the front passenger seat 13 to a rear corner portion of the vehicle 10. Since the rear corner portion of the vehicle 10 and the lateral end portion of the tail gate 40 are close to each other, the knob for opening the sub door 60 is attached to the vicinity of these portions. Thus, the passenger can open the sub door 60 without moving to the widthwise center of the vehicle behind the vehicle. Since the passenger does not move to the widthwise center of the vehicle behind the vehicle, he/she can move the shorter distance around the vehicle.

Referring to FIGS. 1 and 3, the driver's seat 12 is offset toward one lateral side of the vehicle relative to the longitudinal and vertical centerlines C1, C2 of the vehicle while the one lateral edge 50c (FIG. 4) of the sub opening 50 is located oppositely from the driver's seat 12. That is, the sub door 60 begins to be opened at the lateral edge of the sub opening 50 located on the side of the front passenger seat 13. In loading or unloading luggage in a vicinity of a street, it is preferable to do the work off the street. According to the present invention, the sub door 60 is configured to begin to be opened at the end portion on the side of the front passenger seat 13, thereby facilitating the loading or unloading of luggage off the street.

Second Embodiment

Figure 15:
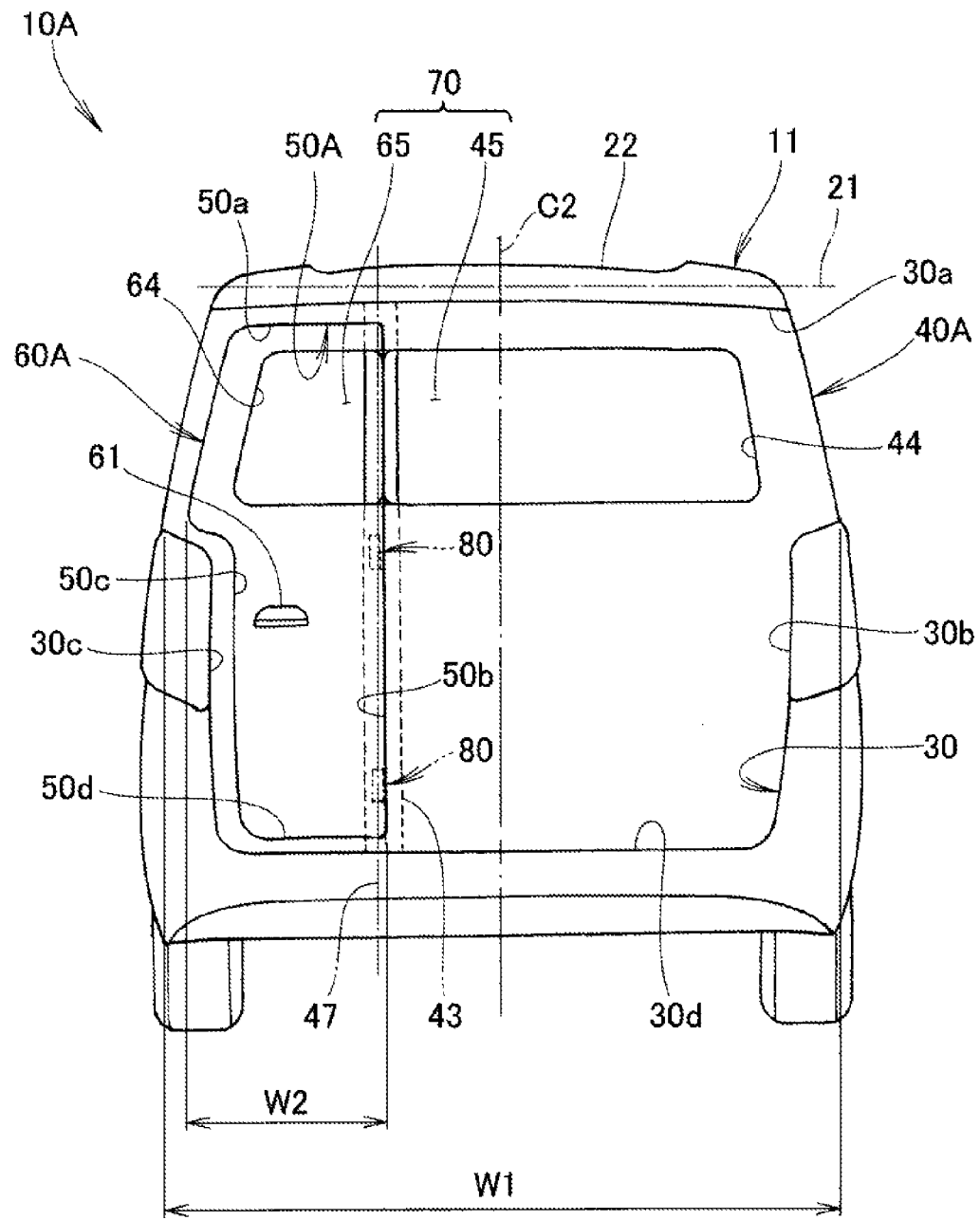
FIG. 15 is a rear elevation view of a vehicle with a tail gate according to a second embodiment of the present invention.

A vehicle with a tail gate according to a second embodiment of the present invention is discussed with reference to FIG. 15. FIG. 15 corresponds to FIG. 3.

As shown in FIG. 15, a vehicle 10A includes a sub door 60A having a width W2=0.3×W1 where W1 is a width of a tail gate 40A. That is, a sub opening 50A is formed to open over the entire range of a generally left half of the tail gate 40A. The vehicle 10A in the second embodiment configured as discussed above has predetermined advantages of the present invention.

Third Embodiment

Figure 16:
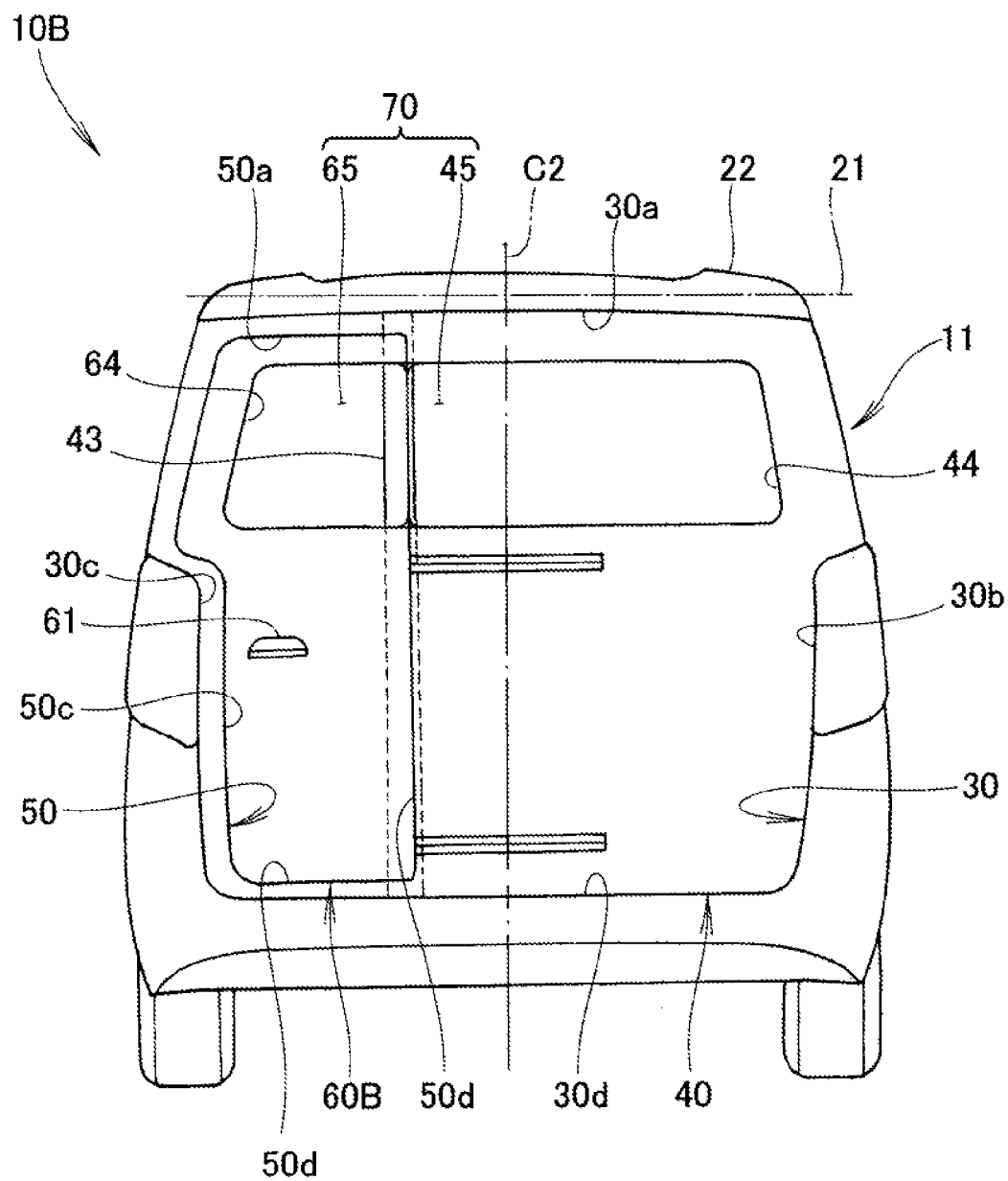
FIG. 16 is a rear elevation view of a vehicle with a tail gate according to a third embodiment of the present invention.

Next, a vehicle with a tail gate according to a third embodiment of the present invention is discussed with reference to FIG. 16. FIG. 16 corresponds to FIG. 3.

As shown in FIG. 16, a vehicle 10B includes a sub door 60B which is a sliding door in a widthwise direction of the vehicle. The vehicle 10B in the third embodiment configured as discussed above has the predetermined advantages of the present invention. Since the sub door 60B is the sliding door, the sub door 60B protrudes a small amount in a rearward direction of the vehicle. The vehicle 10B in the third embodiment does not have hinges 80 (FIG. 4) and the second pivot axis 47 (FIG. 3).

INDUSTRIAL APPLICABILITY

The vehicle with the tail gate according to the present invention is preferably applicable to a van-type vehicle.

REFERENCE SIGNS LIST 10, 10A, 10B: vehicle, 11: vehicle body, 12: driver's seat, 30: rear opening, 40, 40A: tail gates, 44: tail gate window, 45: tail gate window glass, 45a: edge of the tail gate window glass, 50, 50A: sub opening, 50b, 50c: lateral edge of the sub opening, 60, 60A, 60B: sub door, 64: sub door window, 65: sub door window glass, 65a: edge of the sub door window glass

The invention claimed is:

1. A vehicle with a tail gate, the tail gate being supported on a vehicle body for opening and closing in a vertical direction of the vehicle, a rear opening formed in a rear part of the vehicle body, the vehicle comprising:
   a sub opening formed in the tail gate; and
   a single sub door for opening and closing the sub opening in a widthwise direction of the vehicle,
   wherein the sub opening has a width in the widthwise direction of the vehicle set to be smaller than a width of the rear opening,
   wherein the sub opening has a first lateral edge in the widthwise direction of the vehicle located at of one end of the tail gate in the widthwise direction of the vehicle,
   wherein the sub door is supported on the tail gate so as to begin to open the sub opening at the first lateral edge thereof, and
   wherein the sub opening is formed to open only in one of a generally left section or a generally right section of the width of the tail gate,
   and wherein the sub door is supported on a second lateral edge of the sub opening, opposite to the first lateral edge of the sub opening located at an opening side of the sub opening,
   wherein the tail gate has a tail gate window extending between opposite lateral ends of a portion of the tail gate in the widthwise direction of the vehicle, and the sub door has a window that extends between opposite lateral ends of the sub door in a widthwise direction,
   wherein the tail gate window has the same vertical length as that of the sub door window and is located at the same level as the sub door window such that the tail gate window and the sub door window are aligned with each other in the widthwise direction of the vehicle,
   and
   wherein the tail gate has a pillar attached integrally thereto, the pillar extending along the second lateral edge of the sub opening over an entire range in a height direction of the sub opening, and
   wherein the sub door is attached to the pillar with hinges which are provided at a lower position than the tail gate window.

2. The vehicle with a tail gate according to claim 1, wherein the vehicle body has a driver's seat disposed therein, the driver's seat being offset toward one lateral side of the vehicle relative to a widthwise center of the vehicle body,
   wherein the first lateral edge of the sub opening is located oppositely from the driver's seat relative to the widthwise center of the vehicle body.

3. The vehicle with a tail gate according to claim 1, wherein the sub door swings in the widthwise direction of the vehicle.

4. The vehicle with a tail gate according to claim 1, wherein the tail gate window is provided with a tail gate window glass and the sub door window is provided with a sub door window glass, and
   wherein the tail gate window glass has an edge and the sub door window glass has an edge, the edge of the tail gate window glass and the edge of the sub door window glass being opposed directly to each other.

5. The vehicle with a tail gate according to claim 1, wherein the vehicle body has a driver's seat disposed therein, the driver's seat being offset toward one lateral side of the vehicle relative to a widthwise center of the vehicle body, and
   wherein the second lateral edge of the sub opening located closer to the widthwise center of the vehicle body than to the one end of the tail gate is located on a side of the driver's seat relative to the widthwise center of the vehicle body.

* * * * *